US008353105B2

(12) United States Patent
Secherling

(10) Patent No.: US 8,353,105 B2
(45) Date of Patent: Jan. 15, 2013

(54) METHOD AND APPARATUS FOR MACHINING THE BLADE TIPS OF ROTOR WHEEL DRUMS OF TURBOMACHINES

(75) Inventor: Arno Secherling, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1020 days.

(21) Appl. No.: 12/222,932

(22) Filed: Aug. 20, 2008

(65) Prior Publication Data

US 2009/0113683 A1 May 7, 2009

(30) Foreign Application Priority Data

Aug. 30, 2007 (DE) ........................ 10 2007 041 805

(51) Int. Cl.
*B21K 25/00* (2006.01)
*B23P 15/04* (2006.01)

(52) U.S. Cl. .................................... 29/889.23; 29/889.7

(58) Field of Classification Search .................. 29/889.7
See application file for complete search history.

(56) References Cited

U.S. PATENT DOCUMENTS

| | | | |
|---|---|---|---|
| 5,704,826 | A | 1/1998 | De Luis Vizcaino |
| 7,125,312 | B2 | 10/2006 | Castanares |

FOREIGN PATENT DOCUMENTS

| | | | |
|---|---|---|---|
| DE | 34 02 066 | A1 | 8/1985 |
| DE | 197 11 337 | A1 | 9/1998 |
| DE | 603 02 660 | T2 | 8/2006 |
| GB | 2270485 | | 3/1994 |

OTHER PUBLICATIONS

European Search Report dated Dec. 8, 2008 from counterpart European patent application No. 08160657.6.

*Primary Examiner* — David Bryant
*Assistant Examiner* — Moshe Wilensky
(74) *Attorney, Agent, or Firm* — Timothy J. Klima; Shuttleworth & Ingersoll, PLC

(57) ABSTRACT

With rotor wheel drums with integrally formed-on and/or separately attached blading (3, 8) blade tip machining is performed for the completely mounted drum assembly (1, 5) connected to a driven auxiliary turbomachine shaft acting as workpiece carrier (13) in a single apparatus by dry machining the separably assembled blades (8) and by wet machining the integrally formed-on blades (3), with the rotational speed of the workpiece carrier being lower in the wet machining process than in the dry machining process. The area for dry machining is protected by a shield (19) adjustable in the respective separating position against the matter generated in wet machining. Notwithstanding the fact that drums with integrally formed-on blades can be machined without being damaged, optimum gap conditions and correspondingly higher efficiency can be obtained.

6 Claims, 1 Drawing Sheet

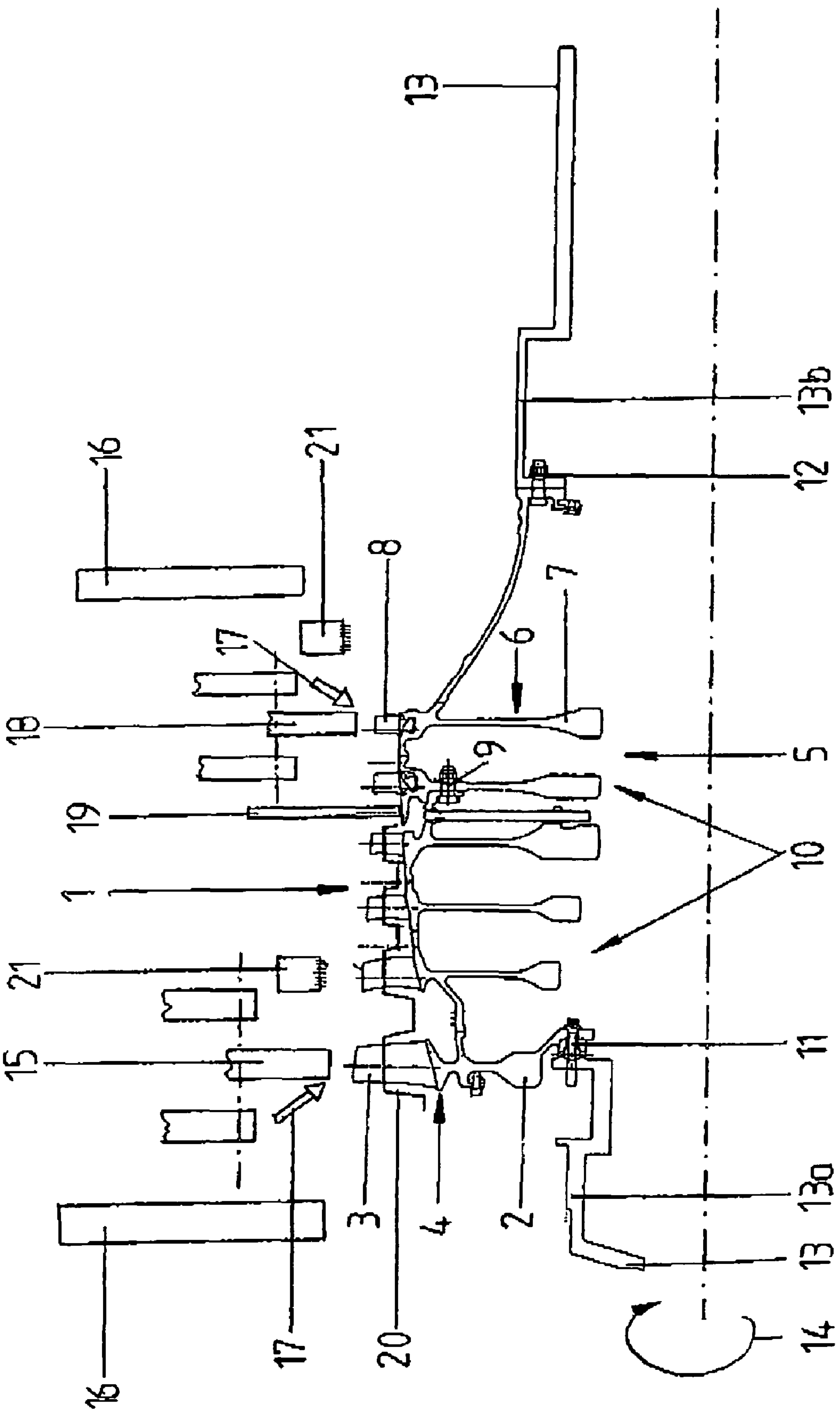
13
13b
12
16
21
8
7
6
17
18
5
9
19
10
1
21
11
15
13a
3
4
2
13
17
20
14
16

METHOD AND APPARATUS FOR MACHINING THE BLADE TIPS OF ROTOR WHEEL DRUMS OF TURBOMACHINES

BACKGROUND OF THE INVENTION

This application claims priority to German Patent Application DE 10 2007 041 805.3 filed Aug. 30, 2007, the entirety of which is incorporated by reference herein.

This invention relates to a method for machining the blade tips of the rotor wheel drums of turbomachines provided with integrally formed-on and/or separately assembled—conventional—blading, with the rotor wheel drum rotating in the process, and an apparatus for the performance of said method.

Rotor wheels of the compressors of turbomachines or rotor drums including several interconnected rotor wheels whose blades are retained on the disk periphery in a slot are, as is generally known, dry ground at the blade tips in a process in which the drum rotates at high speed. As during rotation in the installed state in the turbomachine, the blades retained in the slot are forced outwards by the centrifugal force, enabling the blade tips to be ground to the—minimum—clearance with the casing that is required in service to obtain high efficiency and high surge limit. Grinding the blade tips of the conventionally bladed drum rotating at high speed is further advantageous in that the blades are elastically retained during the machining process by the centrifugal force acting upon them, thereby preventing them from being excessively loaded.

Grinding of integrally manufactured rotor wheels (blisks), i.e. rotor wheels with rotor blades formed on the disk periphery or drums composed of two or more such rotor wheels, is problematic in that, in known high-velocity grinding, strong blade vibrations and the formation and flying of sparks with consequential damage to the blades are encountered.

On gas-turbine engines, it is known and advantageous to compose one and the same rotor wheel drum of the compressor of both integrally manufactured rotor wheels (blisks) and conventionally manufactured rotor wheels, which, moreover, may be made of different materials, for example titanium for the blisks and nickel-base material for the conventionally assembled blades. Due to the different designs, the respective materials and the different effects of the grinding process, either type of drum component and rotor wheel is individually machined in separate machining apparatuses, with assembly to be performed thereafter.

BRIEF SUMMARY OF THE INVENTION

The above process, in which the blade tips are separately machined and assembly is performed thereafter, is, with regard to the application in the engine, disadvantageous in that it hinders the setting of the clearance between the blade tips and the casing wall, which is crucial for compressor efficiency and surge limit, to a minimum amount, which is as uniform as possible.

This invention, in a broad aspect, provides a method for machining the tips of the compressor drums of turbomachines provided with integrally formed-on and/or separately mounted blading which prevents the blading from being damaged during grinding and ensures that optimum clearance between the blade tips and the casing is set and, thus, high compressor efficiency and high surge limit are obtained.

The essence of the present invention is that the completely assembled rotor wheel drum (compressor drum) is machined in a single apparatus in which the rotating workpiece carrier is designed like the actual turbomachine shaft to which the rotor wheel drum will later be installed and that the rotor wheel drum is connected to this type of workpiece carrier in a corresponding manner. Machining of integrally formed-on blades is performed with liquid supply and at a speed that can be lower than the speed used in dry machining the conventional blades. In the case of a drum assembly provided with both integrally formed-on and conventionally mounted blades, the area for dry machining the conventional blades is protected by an adjustable shield against the chips and liquid matter generated in wet machining. In a single apparatus or machine tool—equipped with tools for both dry and wet machining—in which the workpiece carrier in the form of the turbomachine shaft is driveable at different rotational speed, rotor wheel drums with integrally formed-on and/or separably designed blades can be machined at the blade tips with high accuracy and without damage to the integrally formed-on blades or the adjacent, separably designed blades. Machining of both integrally and separably bladed drums as one unit and in one and the same apparatus or machine tool enables minimum tolerances with regard to the outer diameter of the rotor wheel drum and, thus, optimum gap conditions as well as improved efficiency of the turbomachine to be obtained.

For machining the blade tips, grinding wheels with liquid supply for wet grinding of the drums or drum components with integrally formed-on blading and grinding wheels for dry grinding the drums or drum components with conventional blading are provided.

In lieu of grinding wheels, cutting tools or other tooling can, for example, also be provided for blade tip machining.

Tool magazines are allocated to the respective tool holders for rapid tool change, for example for machining blades made of different materials.

For deburring the machined blade tips, the apparatus can be provided with brushing tools or other tooling.

An embodiment of the present invention will be explained in more detail with reference to the attached drawing.

BRIEF DESCRIPTION OF THE DRAWING

FIG. 1 schematically shows an arrangement for blade tip machining of a rotor wheel drum (compressor drum for an aircraft engine) having a first drum with integrally formed-on blades and a second drum with separately manufactured and assembled blades to form a drum assembly.

DETAILED DESCRIPTION OF THE INVENTION

The first drum 1, made of titanium includes four disks in blisk design, i.e. blisks 4 with blade rows or blades 3, respectively, forming one piece with a disk 2 and connected to each other by welding. The second drum 5, here in nickel-base material, includes two conventionally manufactured rotor wheels 6 connected by welding and including a disk 7 on the periphery of which separately manufactured blades 8 are retained in respective slots. The two drums 1 and 5 are combined to a single drum assembly (rotor wheel drum) by fasteners 9, threaded or otherwise. Using first and second releasable attaching elements 11, 12, the rotor wheel drum 10 so formed is fitted, at the front and rear end, to a rotatably borne workpiece carrier 13 (13*a*/13*b*) (auxiliary engine shaft/dummy shaft) which corresponds to a part of the engine shaft actually provided in the engine to drive the rotor wheel drum 10. Thus, the rotor wheel drum 10 is arranged and aligned as one unit in the machining apparatus in the same manner as it will later be fitted within the engine to the engine shaft and the engine casing. Rotation of the workpiece carrier 13 is indicated by arrowhead 14.

Besides the workpiece carrier 13, the apparatus for machining the blade tips of the rotor wheel drum 10 includes a first machining tool 15 suitable for wet and dry machining with a tool magazine 16 allocated for exchange of the tool, here a grinding wheel, and an adjustable fluid supply 17, as well as a second machining tool 18, again with a tool magazine 16 allocated for tool exchange, and an adjustable fluid supply 17 for optional wet or dry grinding operation. In lieu of the grinding wheels, other tools, for example cutters, can also be provided and used.

The blade tip machining apparatus shown in the drawing further includes an axially moveable shield 19 in the form of an annular disk, here arranged between the adjacent blade rows of a blisk 4 and a conventional rotor wheel 6, whose inner diameter is matched to the respective drum diameter.

For machining the blade tips of the previously manufactured first drum 1 with integrally formed-on blades 3 and of the second drum 5 with conventionally fitted blades 8, the first drum 1 and the second drum 5 are, in a first step, connected by the fasteners 9 to form the rotor wheel drum 10. Using the first and second attaching elements 11, 12, this assembly is then connected, at the front and rear side, to the end faces of the two sections 13*a*, 13*b* of the workpiece carrier 13 rotatably borne and coupled to a driving mechanism (not shown). Subsequently, the shield 19 is positioned between the first drum 1 having blisks and the separably bladed second drum 5. Between the integrally formed-on blades 3 of the first drum 1, damping elements 20 for further damping the vibration of the integrally formed-on blades during wet grinding as well as splash guard elements can additionally be provided.

The blade tips of the second drum 5 are machined in a high-velocity grinding process in which the workpiece carrier 13 is rotated at high speed and the blades 8 are forced outwards by the centrifugal force against the second machining tool 18, thereby being ground—elastically retained if necessary—at the blade tips, actually dry, i.e. with the fluid supply 17*b* deactivated. Then, the machining tool 18 is moved over the adjacent blade row to also grind blades 8 in this row in the manner described in the above—if applicable after tool change. Subsequently, the blades 3 of the four welded connected blisks 4 are, integrally and thus rigidly connected to the first drum 1, machined successively at the blade tips in a wet grinding process, i.e. with the vibration-reducing fluid supply activated and at a speed lower than that used in high-velocity grinding. Owing to the reduced velocity of rotation of the workpiece carrier and in connection with the lubricating effect of the supplied liquid, vibration of the, otherwise strongly vibrating, blades 3 is significantly reduced, thus avoiding the risk of damage to the blades by crack formation due to strong vibration. Furthermore, the reduction in vibration and the cooling effect of the liquid stop the formation of sparks, thus preventing adjacent blades from being damaged by flying sparks. In order to further protect the first drum 1 and its blades 3 against vibration and detrimental sparking, damping elements 20 and splash-guard elements can be fitted to these blades 3. The shield 19 protects the second drum 5 and its blades 8, which are conventionally retained in slots, against the wet swarf produced in wet grinding of the blisks 4, which may deposit in the slots, and against detrimental sparks which, if applicable, may be of different materials. For deburring the wet or dry-ground blade tips, brushing tools 21 or other tools are provided in the apparatus. With the method described in the above and the corresponding apparatus or machine tool, respectively, the blade tips of the compressor drum, which forms one unit and is arranged in accordance with the conditions in the turbomachine, are machined such that optimum tip clearance with the casing and, thus, high efficiency and high surge limit are obtained.

LIST OF REFERENCE NUMERALS

1 First drum (blisk drum)
2 Disk
3 Blade (integral)
4 Blisk
5 Second drum (separable blading)
6 Rotor wheel
7 Disk
8 Blade (separate)
9 Fastener (threaded connection between 1/5)
10 Rotor wheel drum (compressor drum, drum assembly)
11 First attaching elements between 10/13
12 Second attaching elements between 10/13
13 Workpiece carrier (auxiliary turbomachine shaft, dummy shaft)
14 Direction of rotation of 13
15 First machining tool (grinding wheel, cutter for blisk)
16 Tool magazine for 15, 18
17 Fluid supply for 15, 18
18 Second machining tool
19 Shield (adjustable annular disk)
20 Damping elements
21 Brushing tool

What is claimed is:

1. A method for machining blade tips of a rotor wheel drum of a turbomachine, the rotor wheel drum having both integrally formed-on and separately assembled blading, comprising:
- clamping an assembled rotor wheel drum onto an auxiliary turbomachine shaft so that such shaft acts as a workpiece carrier;
- rotating the rotor wheel drum;
- machining the blades in accordance with an actual assembly state of the rotor wheel drum in the turbomachine, including:
  - wet machining integrally formed-on blades;
  - dry machining separably attached blades;
  - wherein, the wet machining is performed at a lower rotational speed of the rotor wheel drum than the dry machining; an area to be dry machined is shielded from an area to be wet machined; and, different machining tools are used as required by the respective type of machining and material of the blades to be machined.

2. The method of claim 1, wherein the blade tips are respectively machined by wet and dry grinding.

3. The method of with claim 2, wherein the blade tips are further mechanically processed by brushing.

4. The method of claim 3; wherein both the wet machining and the dry machining are performed while the rotor wheel drum remains clamped on a same axis of rotation so that there is no variation in the axis of rotation between the wet machining and the dry machining.

5. The method of claim 1; wherein both the wet machining and the dry machining are performed while the rotor wheel drum remains clamped on a same axis of rotation so that there is no variation in the axis of rotation between the wet machining and the dry machining.

6. The method of claim 2; wherein both the wet machining and the dry machining are performed while the rotor wheel drum remains clamped on a same axis of rotation so that there is no variation in the axis of rotation between the wet machining and the dry machining.

* * * * *